United States Patent Office

3,531,400
Patented Sept. 29, 1970

3,531,400
DESORPTION OF HYDROCARBONS FROM A MOLECULAR SIEVE IN THE PRESENCE OF WATER AND AMMONIA
Klaus Wehner, Jürgen Welker, and Gunther Seidel, Leuna, Germany, assignors to VEB Leuna-Werke "Walter Ulbricht," Leuna, Germany
No Drawing. Filed Feb. 2, 1968, Ser. No. 702,530
Int. Cl. C10g 25/04; C07c 7/12
U.S. Cl. 208—310   10 Claims

ABSTRACT OF THE DISCLOSURE

There is provided an improved method of separating hydrocarbons from hydrocarbon mixtures by adsorption on natural or synthetic molecular sieves and, if necessary, rinsing the sieve between the adsorption and the desorption steps of a temperature above 250° C., in which the desorption is carried out with a mixture of water vapor and ammonia and/or in the case of separating hydrocarbon mixtures containing water, the adsorption and, if necessary, the rinsing of the molecular sieve, are carried out in the presence of ammonia.

---

This invention relates to a method for the separation of hydrocarbons, especially normal paraffins, from hydrocarbon mixtures by adsorptive treatment of the hydrocarbon mixture with molecular sieves. It relates particularly to a method of improving desorption of loaded molecular sieves at temperatures about 250° C.

Pure hydrocarbons or groups of hydrocarbons have long been employed in the chemical industry as starting materials for commercial synthesis. Of the hydrocarbons, aromatic hydrocarbons, particularly benzene, have been of the greatest importance and, in the last two decades, olefins have also become of considerable importance. Now, in view of the development of biologically readily decomposable washing agent, of detergents, softeners and emulsifiers, normal paraffins in large quantities are becoming of industrial interest. The obtaining of normal paraffins from hydrocarbon mixtures is also important in that normal paraffin-free hydrocarbon mixtures than attain greater utility, for example for gasoline having increased antiknock properties or for jet and diesel fuels having lower turbidity and freezing points.

It is known to separate pure hydrocarbons from more or less complex hydrocarbon mixtures by adsorptive treatment with molecular sieves. The molecular sieves employed are crystalline aluminosilicates of the formula $Me_{2/n}O \cdot Al_2O_3 \cdot xSiO_2 \cdot yH_2O$ in which Me is a cation or various cations with a valence of $n$. The crystals contain highly adsorptive effective interstices which are connected by canals having exactly defined uniform diameters the effective dimension of which depends upon the composition and the crystal structure of the molecular sieve. The various molecular sieves produced have various uniform canal or pore diameters of about 3 angstroms to about 10 angstroms.

For selective adsorption, the uniform diameter of the canals or pores of the molecular sieve is particularly important. For example, to selectively adsorb normal paraffins from a mixture of aromatic and branched hydrocarbons, it is necessary to employ a molecular sieve having a pore diameter of 4.7 angstroms, because normal paraffins have a correspondingly smaller critical diameter. For the adsorptive isolation of normal paraffins from hydrocarbon mixtures the type of molecular sieve, which is commercially designated Type 5A, is particularly suitable.

The methods of isolating pure hydrocarbons from hydrocarbon mixtures by the use of molecular sieve as selective adsorption means operate in principle in the following manner: the hydrocarbon mixture, generally in the presence of inert carrier gases, such as oxygen-free nitrogen or hydrogen, is passed over the molecular sieve until it is saturated with the pure hydrocarbons which are selectively adsorbed, and then desorption is carried out. Frequently between the adsorption and desorption steps there is carried out a rinsing with inert gases to remove unselectively adsorbed hydrocarbons from the surface of the molecular sieve.

These methods have the disadvantage that the inert gases employed as carrier or rinsing gases must preliminarily be subjected to a very intensive drying since water, by silicate transformation, would irreversibly destroy the molecular sieve structure, particularly at relatively high temperatures. Such a drying is commercially very expensive.

The desorption of the adsorbed hydrocarbons can be brought about for example according to the known principles of partial pressure lowering or temperature raising. The disadvantage here is that in the adsorption relatively large quantities of heat are released and, therefore, in the desorption relatively large quantities of heat must be employed. This makes necessary an additional use of cooling and heating steps, which is commercially complicated. Therefore, industrially, up to the present time desorption has been effected by a subsequent adsorption of other adsorbable molecules which displace the molecules first adsorbed. The only heat necessary for the desorption is the difference between the heat of adsorption of the first adsorbed material and the heat of adsorption of material which is used to effect desorption. Thus, it is known to displace selectively adsorbed hydrocarbons with hydrocarbons having three to six carbon atoms, particularly n-pentane.

This method has the disadvantage that only a part of the available capacity of the molecular sieve can be employed. A further disadvantage is that the desorption agent, due to economic considerations, must be recirculated and must be in very pure form. Particularly expensive is the separation of the desorption agent from the desorbed pure hydrocarbon, which is necessary to obtain the desired hydrocarbon in the purest form and, moreover, which is necessary to maintain the greatest effectiveness of the substance which is used as the desorption agent.

These disadvantages do not occur in the case of desorption agents which are normally gaseous and are readily separable from the desorbed hydrocarbons, such as propane and carbon dioxide. These desorption agents, however, have the disadvantage that under the usual commercial operating conditions their desorption effect is almost always slight, in part even poor, and, consequently, they do not sufficiently desorb the adsorbed pure hydrocarbon from the molecular sieve. This leads to a rapid decrease in the capacity of the molecular sieve, especially when the molecular sieve is being used for the isolation of hydrocarbons having more than ten carbon atoms per molecule. Moreover, the time and the amount of desorption agent required is greatly increased.

Further, it is known to desorb selectively adsorbed hydrocarbons with anhydrous ammonia or to carry out the separation of hydrocarbon mixtures in the presence of anhydrous ammonia, in both of which cases the hydrocarbon mixture to be separated must likewise be anhydrous.

Ammonia is extremely effective as the desorption agent, but it has the notable disadvantage that under conditions of relative cold it tends to cause the deposition of ammonium salts, which leads to commercial difficulties. Besides, in the application of ammonia as the desorption agent, repeated reactivation of the molecular sieve, which is necessary for commercial and economic reasons, is not possible in the conventional ways.

It is furthermore known to effect the separation of olefins in the presence of basic nitrogen compounds of the general formula

in which $R_1$, $R_2$ and $R_3$ are hydrogen and alkyl radicals, in order to decrease the polymerization activity of the olefins. These nitrogen compounds, however, lead to a sharp decrease in the adsorption capacity of the molecular sieve for hydrocarbons.

It is, on the other hand, known to employ water as the desorption agent. This indeed has an outstanding desorption effect and is readily separable from the desorbed hydrocarbons; the molecular sieve is, however, at temperatures over 250° C. very rapidly irreversibly decomposed by water.

It is the object of the invention to eliminate the disadvantages of the known methods, especially the deposition of ammonium salts and the destructive action of water on the molecular sieve.

According to the invention, hydrocarbon mixtures are separated by the use of inexpensive and highly effective desorption agents which are readily separable from the desorbed hydrocarbons and by the use of conventional molecular sieves.

In particular, according to the invention, there is provided a method for the separation of hydrocarbons from hydrocarbon mixtures comprising selective adsorption of the hydrocarbon which it is desired to adsorb on natural or synthetic molecular sieves, subsequent desorption of the adsorbed hydrocarbon from the molecular sieve and, if necessary, rinsing of the molecular sieve between the adsorption and the desorption steps at a temperature above 250° C., in which the desorption is carried out with a mixture of water vapor and ammonia, and/or in the case of separating hydrocarbon mixtures containing water the adsorption and, if desired or necessary, the rinsing of the molecular sieve, is carried out in the presence of ammonia.

The operating conditions for the method of the invention are the known and generally employed pressures, temperatures, and rates of feedthrough, which are, for example, respectively, from 1 to 50 atmospheres, from 20 to 500° C., and from 0.1 to 10 g./g. hr. for adsorption and desorption.

It is preferable that in the desorption of the adsorbed hydrocarbon by the treatment of the charged molecular sieve with water vapor and ammoina, that the water vapor and ammonia be employed in the molar ratio of water vapor to ammonia of from 0.05:1 to 1000:1, preferably 0.5:1 to 100:1. With respect to the above referred to separation of hydrocarbon mixtures containing water by using ammonia during adsorption and, optionally rinsing the molecular sieve, it is advantageous that the molar ratio of ammonia to water be from 10:1 to 500:1, preferably 50:1 to 250:1. According to the method of the invention, there is thus provided a very inexpensive and highly effective desorption agent which can very easily be separated from the desorbed pure hydrocarbon after cooling the desorbed hydrocarbon to room temperature. Surprisingly, the negative consequences of the use of water vapor or ammonia alone as the desorption agent are eliminated by the use of a combination of both of these substances. The presence of ammonia completely eliminates the destructive effect of water vapor on the molecular sieve at temperatures above 250° C. so that the crystal lattice structure in the molecular sieve remains completely unchanged. On the other hand, a molecular sieve employed to carry out the method of the invention can be reactivated without any negative effect, which is not possible when ammonia alone is employed.

A further advantage of the invention is that, in contrast to the prior art methods, the hydrocarbon mixture and any carrier or washing gases employed do not have to be dried. This is an essential simplification of conventional technology. Moreover, there is also an elimination of the difficulties which arise in the exclusive use of ammonia as the desorption agent due to the tendency of ammonium salts to deposit on cooler parts of the equipment at lower temperatures. In the present invention, the deposited ammonium salts can be eliminated by washing with water without the consequent destruction of the crystal structure of the molecular sieve as a result of the water with which the recyling gas has been enriched.

The method of the invention is suitable for all separaions of hydrocarbons from hydrocarbon mixures which can be effeced by the use of molecular sieves, for example, the separation of aromatc compounds, paraffins or olefins from hydrocarbon mixtures. A particularly significant application of the invention is the separation of normal paraffins from hydrocarbon mixtures by the use of molecular sieves of Type 5A.

The invention will now be further described by reference to the following examples, which are intended, however, only to illustrate and not to limit the invention.

EXAMPLE 1

A light gas oil obtained from crude petroleum with a boiling range of 240 to 320° C., a normal paraffin content of 22% by weight, and a water content of less then 10 p.p.m., is separated on a conventional molecular sieve of Type 5A in an adsorption column having a diameter of 45 mm., under the following conditions:

Adsorption temperature: 380° C.

Adsorption pressure: 1 atmosphere

Adsorption rate of feedthrough (grams per hour of light gas oil fed through column per gram of the molecular sieve in the column): 0.5 g./g. Hr.

Carrier gas: $H_2$

Carrier gas to light gas oil ratio: 500 normal cubic meters/cubic meter.

Cycle duration: 20 minutes (10 minutes adsorption, 10 minutes desorption)

Desorption temperature: 380° C.

Desorption pressure: 1 atmosphere

Desorption rate of feedthrough (grams per hours of desorption agent fed through the column per gram of the molecular sieve in the column):

0.5 g./g. hr.

As the desorption agent there is employed an aqueous ammonia solution containing 5% by weight of ammonia. There is obtained 20% by weight of normal paraffin, based on the weight of the initial light gas oil, with a purity of 97% by weight.

The adsorption-desorption cycle was repeated numerous times in order to determine the durability of the molecular sieve.

In the same way, comparative runs were made with aqueous n-propylamine solution and other runs with water as the desorption agent.

The results are summarized in the following table:

TABLE 1

| Desorption Agent | Break-through capacity (weight percent) | | |
| --- | --- | --- | --- |
| | Initial | After 240 cycles | After an oxidative regeneration |
| Aqueous $NH_3$ solution | 6.7 | 5.1 | 6.5 |
| Aqueous n-propylamine solution | 6.6 | 4.8 | 6.3 |
| Water | 6.7 | 1.5 | 4.4 |

The addition of basic nitrogen compounds to water leads to a considerable increase in the stability to water vapor of conventional molecular sives, which will further be increased by the introduction of ammonia.

Regeneration of the molecular sieve desorbed according to the invention results in the essential revival of its initial break-through capacity.

EXAMPLE 2

A mixture of N-heptane and benzene with a benzene content of 15% by weight is separated on a commercially conventional molecular sieve of Type 13x in a 65 mm. diameter adsorption column, under the following conditions:

Adsorption temperature: 290° C.
Adsorption pressure: 1 atmosphere
Adsorption throughout: 1.5 g./g. hr.
Cycle duration: 25 minutes (12.5 minutes of adsorption, 12.5 minutes of desorption)
Desorption temperature: 290° C.
Desorption pressure: 1 atmosphere
Desorption throughput: 1.0 g./g. hr.

As the desorption agent there is employed in one run water and in another run an aqueous ammonia solution having an ammonia content of 2% by weight. In either case there is obtained 14% by weight of benzene based on the weight of the initial feed, with a purity of 97% weight.

The improvement according to the invention of the stability of the molecular sieve to water vapor by the addition of ammonia is illustrated in the following Table:

TABLE 2

| Desoprtion Agent | Break-through capacity (weight percent) | |
| --- | --- | --- |
|  | Initial | After 200 hours |
| Water vapor | 7.5 | 0 |
| Aqueous NH₃ solution | 7.5 | 6.9 |

This table clearly shows that by the method of the invention the capacity of the molecular sieve remains essentially constant, whereas in the case of desorption with water vapor the molecular sieve is completely destroyed.

EXAMPLE 3

A light gas oil according to Example 1 is, without preliminary drying (water content 150 p.p.m.), separated on a commercially conventional molecular sieve of Type 5A in an adsorption column of 80 mm. diameter under the following conditions:

Adsorption temperature 390° C.
Adsorption pressure: 10 atmosphere
Adsorption throughput: 0.6 g./g. hr.
Carrier gas: $H_2$
Ratio of the carrier gas to the light gas oil feed: 500 normal cubic meters/cubic meter
Cycle duration: 20 minutes (10 minutes of adsorption, 10 minutes of desorption)
Desorption temperature: 390° C.
Desorption pressure: 10 atmospheres
Desorption agent: n-pentane
Desorption throughout: 0.8 g./g. hr.

The light gas oil feed was mixed with ammonia in the proportion of 0.5% by weight. There was thus obtained 20.5% by weight of normal paraffin, based on the weight of the light gas oil feed with a purity of 98.5% by weight. Comparative runs were made under the same conditions treating a water containing starting material, but in one case with the addition of ammonia, in another case without the addition of ammonia and without drying of the light gas oil feed, and in a third case without the addition of ammonia and with the preliminary drying of the light gas oil feed to a water content of 10 p.p.m. The results are summarized in the following table:

TABLE 3

| Desorption Agent | Break-through capacity (weight percent) | |
| --- | --- | --- |
|  | Initial | After 500 hours |
| Addition of 0.5 weight percent NH₃ to the feed | 8.0 | 5.3 |
| Without NH₃ addition to the feed | 8.1 | 3.5 |
| Preliminarily dried feed (water content 10 p.p.m. without NH₃ addition) | 8.0 | 5.4 |

Therefore, the method of the invention can be used with water-containing feeds without the occurrence of a great decrease in the capacity of the molecular sieve.

While the invention has been described by reference to preferred embodiments thereof, it is to be understood that the scope of the invention, as defined by the appended claims, is intended to include not only these embodiments, but also all obvious modifications and variations thereof.

What is claimed is:

1. A method for selectively separating desired hydrocarbons from a hydrocarbon mixture which comprises passing a hydrocarbon mixture to be separated into contact with a molecular sieve adsorbent on which the desired hydrocarbon is selectively adsorbed and thereafter desorbing said desired hydrocarbons from said molecular sieve adsorbent by passing a mixture of water vapor and ammonia having a molar ratio of 0.05:1 to 1000:1 as desorption agent in contact with the molecular sieve adsorbent containing adsorbed hydrocarbon wherein said desorption is carried out at a temperature of at least 250° C.

2. Method according to claim 1 which comprises rinsing said molecular sieve adsorbent with water at a temperature above 250° C. intermediate said adsorption and desorption steps.

3. Method according to claim 1 wherein the desired hydrocarbon to be separated is at least one normal paraffin and the molecular sieve adsorbent is a 5 A. molecular sieve.

4. Method according to claim 1 wherein said adsorption and desorption are carried out a temperature above 250° C.

5. Method according to claim 1 wherein said desorption agent is an aqueous ammonia solution containing 5% by weight of ammonia and said adsorption and desorption are carried out at a temperature of 380° C.

6. Method according to claim 1 wherein said desorption agent is an aqueous ammonia solution containing 2% by weight of ammonia and said adsorption and desorption are carried out at a temperature of 290° C.

7. A method of selectively separating desired hydrocarbons from a hydrocarbon mixture which comprises passing a hydrocarbon mixture to be separated which contains at least 150 p.p.m. water and ammonia having a molar ratio of water to ammonia of 1:10 to 1:500 into contact with a molecular sieve adsorbent on which the desired hydrocarbon is selectively adsorbed, and thereafter desorbing said desired hydrocarbons from said molecular sieve adsorbent by passing ammonia as desorption agent in contact with the molecular sieve adsorbent containing adsorbed hydrocarbon, said adsorption and desorption being carried out at a temperature above 250° C.

8. Method according to claim 7 wherein the molar ratio of the water contained in said hydrocarbon mixture to ammonia is 1:50 to 1:250.

9. Method according to claim 7 wherein said hydrocarbon mixture contains water in an amount of 150 p.p.m. and ammonia in an amount of 0.5% by weight and said adsorption and desorption are carried out at a temperature of 390° C.

10. Method according to claim 7 which comprises rinsing said molecular sieve adsorbent at a temperature above 250° C. intermediate said adsorption and desorption steps.

References Cited

UNITED STATES PATENTS

| | | | |
|---|---|---|---|
| 2,818,449 | 12/1957 | Christensen et al. | 208—310 |
| 2,886,509 | 5/1959 | Christensen et al. | 208—310 |
| 3,070,542 | 12/1962 | Asher et al. | 208—310 |
| 3,242,070 | 3/1966 | Epperly et al. | 208—310 |
| 3,271,303 | 9/1966 | Epperly et al. | 208—310 |
| 3,306,848 | 2/1967 | Wackher et al. | 208—310 |
| 3,306,945 | 2/1967 | Conviser | 208—310 |
| 3,309,311 | 3/1967 | Epperly et al. | 208—310 |

HERBERT LEVINE, Primary Examiner

U.S. Cl. X.R.

260—676